US010030700B2

(12) United States Patent
Hoshide et al.

(10) Patent No.: US 10,030,700 B2
(45) Date of Patent: Jul. 24, 2018

(54) GUIDING BODY AND MOTION-GUIDING DEVICE PROVIDED WITH SAME

(71) Applicant: THK CO., LTD., Tokyo (JP)

(72) Inventors: Kaoru Hoshide, Tokyo (JP); Hiroaki Mochizuki, Tokyo (JP); Hiroomi Kuribayashi, Tokyo (JP); Akito Kaneko, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 14/406,434

(22) PCT Filed: Sep. 6, 2013

(86) PCT No.: PCT/JP2013/074063
§ 371 (c)(1),
(2) Date: Dec. 8, 2014

(87) PCT Pub. No.: WO2014/042089
PCT Pub. Date: Mar. 20, 2014

(65) Prior Publication Data
US 2015/0176643 A1 Jun. 25, 2015

(30) Foreign Application Priority Data

Sep. 13, 2012 (JP) .................................. 2012-201718
Jan. 18, 2013 (JP) .................................. 2013-007278

(51) Int. Cl.
*A47B 88/00* (2017.01)
*F16C 29/06* (2006.01)
(Continued)

(52) U.S. Cl.
CPC .......... *F16C 29/0611* (2013.01); *F16C 21/00* (2013.01); *F16C 29/005* (2013.01);
(Continued)

(58) Field of Classification Search
CPC .............. F16C 29/0638; F16C 29/0619; F16C 29/0688
(Continued)

(56) References Cited

U.S. PATENT DOCUMENTS 42,066 A * 3/1864 Bishop .................. F16C 29/064
295/32
888,366 A * 5/1908 Sutton .................... A47B 17/00
108/92
(Continued)

FOREIGN PATENT DOCUMENTS

JP 59-166022 U 11/1984
JP 61-136018 A 6/1986
(Continued)

OTHER PUBLICATIONS

International Search Report dated Nov. 5, 2013, issued in corresponding application No. PCT/JP2013/074063.

*Primary Examiner* — Matthew W Ing
(74) *Attorney, Agent, or Firm* — Westerman, Hattori, Daniels & Adrian, LLP

(57) ABSTRACT

A guide body can be prevented from being disengaged from a track rail even where the track rail is made of a low-rigidity material, thereby securing reliable movement along the track rail. The guide body includes: a large number of rolling elements that roll on a rolling surface formed along a structure, the guide body being movable relative to the structure; an endless circulation path through which the large number of rolling elements circulate; a load opening portion for allowing the large number of rolling elements in the endless circulation path to be held in contact with the rolling surface of the structure; and a guide portion formed on at least one side of the load opening portion so as to project toward the structure side with respect to projecting (Continued)

ends of the large number of rolling elements projecting from the load opening portion toward the structure side.

12 Claims, 16 Drawing Sheets

(51) Int. Cl.
    *F16C 29/00*     (2006.01)
    *F16C 21/00*     (2006.01)

(52) U.S. Cl.
    CPC ........ *F16C 29/063* (2013.01); *F16C 29/0604* (2013.01); *F16C 29/0616* (2013.01); *F16C 29/0623* (2013.01); *A47B 2210/0032* (2013.01); *A47B 2210/0035* (2013.01)

(58) Field of Classification Search
    USPC ............ 312/334.11, 334.13, 334.17, 334.33, 312/334.34; 384/43–45
    See application file for complete search history.

(56) References Cited

U.S. PATENT DOCUMENTS

| | | | |
|---|---|---|---|
| 4,557,530 A * | 12/1985 | Haase | ................... F16C 29/005 |
| | | | 384/45 |
| 4,647,226 A | 3/1987 | Mottate | |
| 4,844,624 A | 7/1989 | Teramachi | |
| 5,076,713 A | 12/1991 | Morita | |
| 8,091,851 B2 * | 1/2012 | Yamada | ............... B60N 2/0705 |
| | | | 248/429 |

FOREIGN PATENT DOCUMENTS

| | | | |
|---|---|---|---|
| JP | 63-293319 A | 11/1988 |
| JP | 3-144113 A | 6/1991 |
| JP | 3-213714 A | 9/1991 |

* cited by examiner

GUIDING BODY AND MOTION-GUIDING DEVICE PROVIDED WITH SAME

TECHNICAL FIELD

The present invention relates to a guide body for moving a movable body such as a drawer relative to a structure such as a furniture piece, and to a motion guide device including the same.

BACKGROUND ART

As the above-mentioned motion guide device, there has been known a motion guide device as disclosed in JP 59-166022 U. This motion guide device includes a track rail having a rolling surface for rolling elements, and a guide body assembled to the track rail through intermediation of a large number of the rolling elements in a freely movable manner. The rolling elements roll under a load between the rolling surface of the track rail and a rolling surface on the guide body side. With this, the guide body can be moved along the track rail. Such motion guide devices are utilized mainly, for example, in a linear guide portion of a working machine. The motion guide devices for such uses are required to have high load bearing capability, and to guide objects with high accuracy.

Thus, in the related-art motion guide devices, the rolling surfaces of the track rail and the guide body on which the rolling elements roll need to be formed by a grinding process in a unit of μm, and a quenching process needs to be executed on steel to be formed into the track rail and the guide body so that the rolling surfaces have higher durability and higher load bearing property. Such processes increase production cost of the motion guide devices.

CITATION LIST

Patent Literature

[PTL 1] JP 59-166022 U

DISCLOSURE OF THE INVENTION

Problems to be Solved by the Invention

Incidentally, the motion guide devices constructed as described above are becoming more widely used. As the markets therefor, applications to a drawer mechanism of wooden furniture pieces, interior equipment of aircrafts, trains, or the like, and to home electric appliances have been promising. In such cases, movement accuracy of the above-mentioned guide body need not be high. Instead, three factors, that is, weight reduction, cost reduction, and motion smoothness are mainly required as evaluation indices of the motion guide devices. In order to satisfy those demands, it is appropriate to use relatively low-rigidity production materials for the track rail and the guide body, such as a resin material and aluminum.

However, in a case where the low-rigidity materials such as a resin material and aluminum are used for the track rail, the rolling surface to be formed along the track rail may be corrugated. As a result, gaps may be formed between the rolling surface formed along the track rail and the rolling elements, and between the rolling surface of the guide body and the rolling elements, which may cause a problem in that the guide body is disengaged from the track rail.

Further, in order to satisfy the above-mentioned demand of reducing the production cost of the motion guide device, there is also a need to form the rolling surface for the rolling elements directly along the structure without using the track rail. Also in such cases, the rolling surface formed along the structure may be corrugated. As a result, as in the case where the low-rigidity materials such as a resin material and aluminum are used for the track rail, the problem in that the guide body is disengaged from the structure may occur.

Means for Solving the Problems

The present invention has been made to solve such problems, and it is an object thereof to provide a guide body that can be prevented from being disengaged from a track rail even in a case where the track rail is made of a low-rigidity material, thereby securing reliable movement along the track rail. It is another object of the present invention to provide a motion guide device including the guide body.

Specifically, according to one embodiment of the present invention, there is provided a guide body, including: a large number of rolling elements that roll on a rolling surface formed along a structure, the guide body being movable relative to the structure; an endless circulation path through which the large number of rolling elements circulate; a load opening portion for allowing the large number of rolling elements in the endless circulation path to be held in contact with the rolling surface of the structure; and a guide portion formed on at least one side of the load opening portion so as to project toward the structure side with respect to projecting ends of the large number of rolling elements projecting from the load opening portion toward the structure side.

Further, according to one embodiment of the present invention, a motion guide device including the guide body is a motion guide device including: a track rail having a rolling surface for rolling elements; and a guide body assembled to the track rail through intermediation of a large number of the rolling elements in a freely movable manner, the guide body including: an endless circulation path through which the rolling elements circulate; a load opening portion for allowing the rolling elements in the endless circulation path to be held in contact with the rolling surface of the track rail; and a guide portion formed on at least one side of the load opening portion so as to project toward the track rail side with respect to projecting ends of the rolling elements projecting from the load opening portion toward the track rail side, the track rail including a swelling portion extending along a longitudinal direction of the track rail, the rolling surface for the rolling elements being formed on the swelling portion, the swelling portion having a side surface that faces the guide portion of the guide body.

Effects of the Invention

According to one embodiment of the present invention, in a case where the structure or the track rail is made of a low-rigidity material so that the rolling surface formed on one of those components is corrugated, even when the rolling elements that roll on this rolling surface are separated from the rolling surface, the guide portion formed on the guide body is engaged with the structure and the like, and the guide portion is held in sliding contact with the structure and the like. With this, the guide body is slid and guided along the structure and the like. As a result, disengagement of the guide body from the structure can be prevented.

MODE FOR CARRYING OUT THE INVENTION

Figure 1:
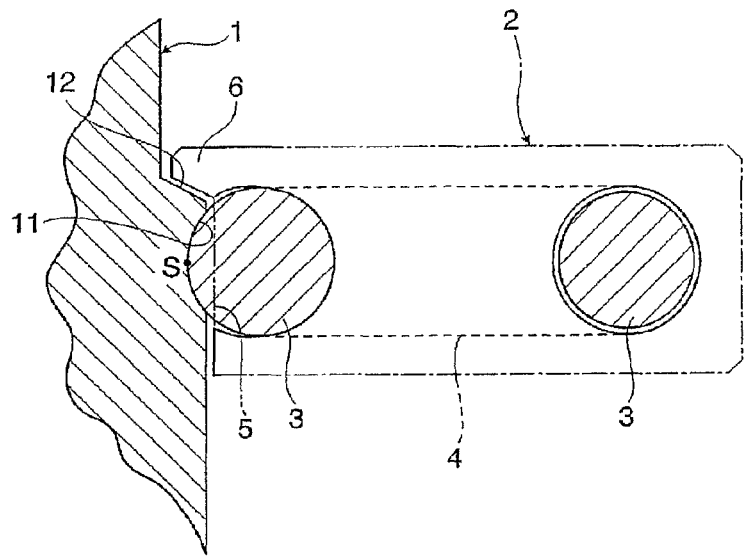
FIG. 1 is a schematic view of a guide body to which the present invention is applied.

FIG. 1 is a schematic view illustrating a relationship between a guide body to which the present invention is applied and a structure. This guide body 2 is assembled to a structure 1 such as a furniture piece and is used in a freely movable manner. The structure 1 has a rolling surface 11, and the guide body 2 includes a large number of balls 3 as rolling elements that roll on the rolling surface 11, and an endless circulation path 4 for those balls 3. When the balls 3 circulate in this endless circulation path 4, the guide body 2 is movable relative to the structure 1.

Meanwhile, the guide body 2 according to the present invention has a load opening portion 5 for allowing the balls 3 in the endless circulation path 4 to be held in contact with the rolling surface 11 of the structure 1. Specifically, spherical surfaces of the balls 3 in the endless circulation path 4 are partially exposed from this load opening portion 5 to an outside of the guide body 2. In addition, in this guide body 2, a guide portion 6 is formed at least on one side of the load opening portion 5. This guide portion 6 projects toward the structure 1 side with respect to tops S of the spherical surfaces of the balls 3, which are exposed from the load opening portion 5. In other words, the spherical surfaces of the balls 3, which are exposed from the load opening portion 5, are arranged so as to come to a position more spaced apart from the structure 1 than a distal end portion of the guide portion 6. With this configuration, in the structure 1, a part at which the rolling surface 11 is formed is spontaneously formed into a swelling portion 12 projecting to the guide body 2 side.

In such a configuration, when the structure 1 is made of a low-rigidity material, the rolling surface 11 may be corrugated. Thus, at the time when the guide body 2 is moved relative to the structure 1, a gap may be formed between the rolling surface 11 and the spherical surfaces of the balls 3, which are exposed from the load opening portion 5. As a result, the balls 3 may be separated from the rolling surface 11, and the guide body 2 may be disengaged from the structure 1. However, according to the guide body 2 of the present invention, the guide portion 6 is engaged with the swelling portion 12 formed along the structure 1, and this guide portion 6 guides the guide body 2 along the structure 1 in sliding contact with the swelling portion 12. Thus, the guide body 2 can be prevented from dropping off the structure 1.

Note that, in FIG. 1, the rolling surface 11 is formed directly on the structure 1. However, a track rail having the rolling surface 11 may be fixed to the structure 1, and the guide body 2 may be assembled to this track rail. Further, in FIG. 1, the guide body 2 has the single endless circulation path 4. However, a plurality of endless circulation paths 4 may be formed as long as the balls 3 can be endlessly circulated. Still further, a size and a forming material of the balls 3 that roll through the endless circulation path 4 may be arbitrarily set. Yet further, in FIG. 1, the single guide portion 6 is formed on the guide body 2 so that the guide body 2 is prevented from dropping off the structure 1 due to the gravity. However, from the viewpoint of simplifying a work of mounting the guide body 2 to the structure 1, the guide portion 6 may be formed on each side of the load opening portion 5. In addition, various metal materials, resin materials, and the like may be used as the forming material of the guide body 2. Further, when manufacturing the guide body 2 considering reduction in cost, a forging process and a casting process on various metal materials, injection molding of the resin materials, and the like may be performed as appropriate. In this case, as described above, the guide portion 6 guides the guide body 2 along the structure 1 in sliding contact with the swelling portion 12. Thus, it is preferred that the guide body 2 be made of materials excellent in anti-friction property and anti-abrasion property, such as polyoxymethylene (POM).

Now, with reference to the accompanying drawings, more detailed description is made of the guide body to which the present invention is applied and the motion guide device including the guide body according to an embodiment of the present invention.

Figure 2:
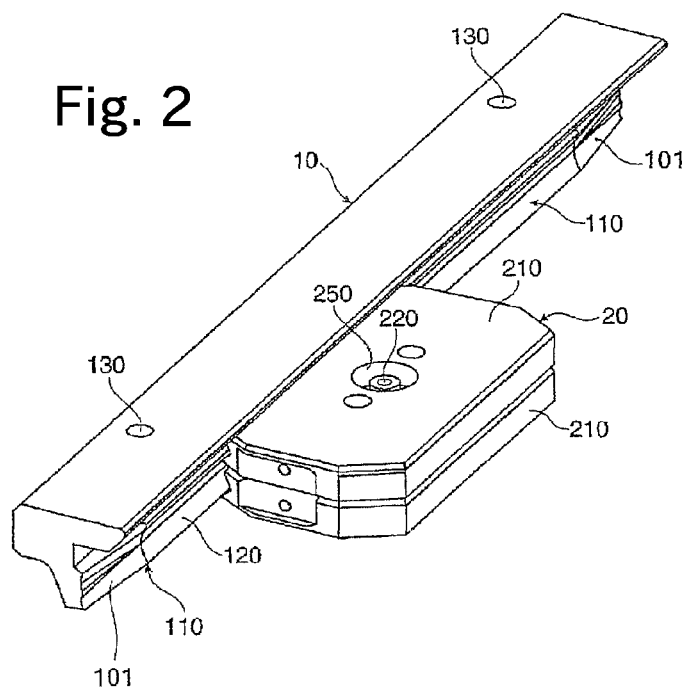
FIG. 2 is a perspective view of an example of a motion guide device including the guide body according to an embodiment of the present invention.
Figure 3:
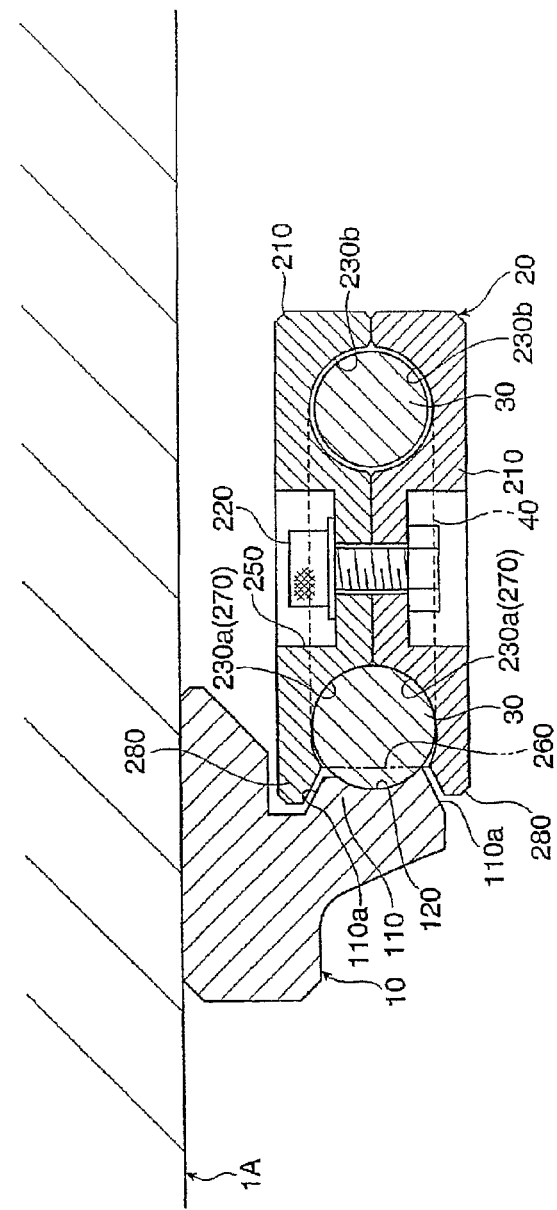
FIG. 3 is a front sectional view of the motion guide device illustrated in FIG. 2.

FIGS. 2 and 3 illustrate the guide body and the motion guide device including the guide body according to the embodiment of the present invention. FIG. 2 is a perspective view, and FIG. 3 is a front sectional view. In this embodiment, a track rail 10 having a rolling surface 120 for balls 30 is fixed to a structure 1A such as a furniture piece. The motion guide device includes the track rail 10 to be fixed to the structure 1A, and a guide body 20 assembled to the track rail 10 through intermediation of the large number of balls 30. With this, the guide body 20 is movable along the track rail 10. The track rail 10 is formed into a linear shape along a longitudinal direction of the structure 1A. This track rail 10 has a swelling portion 110 formed continuously along the longitudinal direction, and the single rolling surface 120 on which the balls 30 roll is formed in a distal end surface of the swelling portion 110. Further, along the longitudinal direction of the track rail 10, mounting holes 130 for fixing bolts are formed at predetermined intervals, which are utilized at the time of fixing the track rail 10 to the structure 1A.

In this case, reference symbol 101 in FIG. 2 denotes auxiliary chamfered surfaces. The auxiliary chamfered surfaces are formed so as to allow the guide body 20 to be smoothly shifted between adjacent track rails 10 when a plurality of track rails 10 each constructed as described above are aligned along the structure 1A. The auxiliary chamfered surfaces 101 need not be formed in a case where the plurality of track rails 10 are not aligned on the structure 1A.

Meanwhile, the guide body 20 has the single endless circulation path 40 for the balls 30. When the balls 30 circulate in the endless circulation path 40, the guide body 20 is movable along the track rail 10. A movable body such as a table can be fixed to this guide body 20 so that the movable body is movable along the track rail 10 relative to the structure 1A in conjunction with the movement of the guide body 20.

Figure 4:
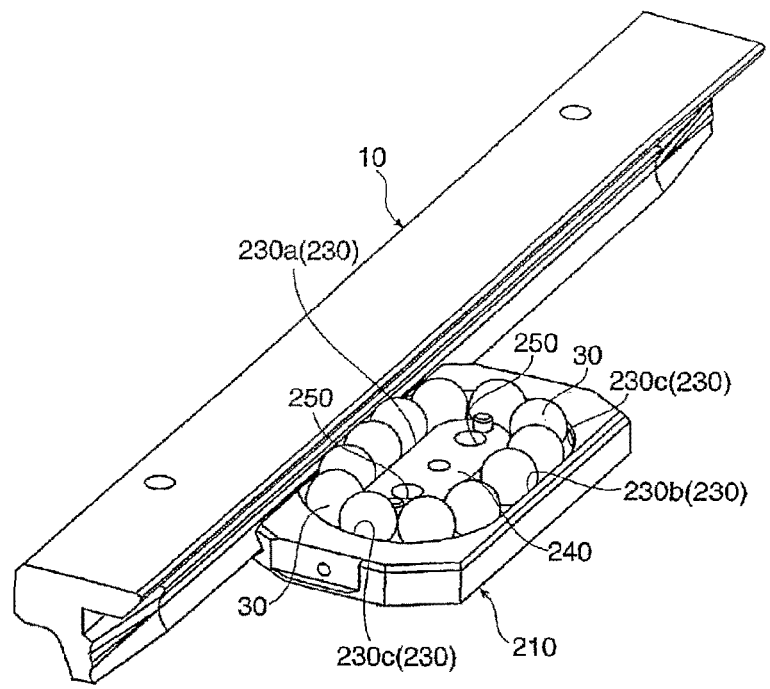
FIG. 4 is a perspective view of an internal structure of the guide body illustrated in FIG. 2.

The guide body 20 includes a pair of halves 210 formed into the same shape, and the pair of those halves 210 are coupled to each other with fixing bolts 220. As illustrated in FIG. 4, in each of the halves 210, a ball rolling groove 230 is formed as an endless rolling-element rolling groove. The pair of halves 210 are combined with each other so that the respective ball rolling grooves 230 face each other. The large number of balls 30 are arranged between the ball rolling groove 230 of one of the halves 210 and the ball rolling groove 230 of the other of the halves 210. That is, when the pair of halves 210 are coupled so as to face each other, the endless circulation path 40 for the balls 30 is completed.

The ball rolling groove 230 formed in each of the halves 210 has a load rolling groove 230a formed into a linear shape along a longitudinal side of the half 210, a no-load rolling groove 230b formed parallel to this load rolling groove 230a, and a pair of direction converting grooves 230c for coupling the load rolling groove 230a and the no-load rolling groove 230b to each other. A projection portion 240 is formed between the load rolling groove 230a and the no-load rolling groove 230b. When the pair of halves 210 are assembled to each other, the projection portions 240 of the halves 210 are coupled to each other with the fixing bolts 220. In FIGS. 3 and 4, reference symbol 250 denotes fixing holes for inserting the fixing bolts 220 therethrough. Note that, in FIG. 4, for the sake of easier understanding of an internal structure of the halves 210, only one of the halves 210 is illustrated.

As described above, when the pair of halves 210 are coupled to each other with the fixing bolts 220 so that the respective ball rolling grooves 230 face each other, the load rolling grooves 230a face each other to form a load path for the balls 30. Meanwhile, the no-load rolling grooves 230b face each other to form a no-load path for the balls 30. Further, the direction converting grooves 230c face each other to form direction converting paths for the balls 30. In this way, the endless circulation path 40 for the balls 30 is formed into a tunnel shape in the guide body 20, and the large number of balls 30 are arranged in this endless circulation path 40.

In this case, the load rolling groove 230a is formed along the longitudinal side of the half 210 so that the spherical surfaces of the balls 30 are not perfectly covered over 180° (refer to FIG. 3). Thus, under a state in which the pair of halves 210 are coupled to each other, when the load rolling grooves 230a face each other, a load opening portion 260 is formed so as to open to the rolling surface 120 of the track rail 10. With this, a part of each of the spherical surfaces of the balls 30 that roll through the load path is exposed from the load opening portion 260 to an outside of the guide body 20. Then, the part of each of the spherical surfaces of the balls 30, which are exposed to the outside of the guide body 20, is held in contact with the rolling surface 120 of the track rail 10.

Further, when the load rolling grooves 230a face each other, a load rolling surface 270 that faces the rolling surface 120 of the track rail 10 is formed. This load rolling surface 270 is formed into a Gothic arch shape in cross-section perpendicular to a longitudinal direction of the guide body 20. This Gothic-arch load rolling surface 270 is formed of two circular-arc curved surfaces intersecting with each other at an angle of substantially 90°, and the balls 30 are each held in contact at two points with the load rolling surface 270. Note that, the load rolling surface 270 need not necessarily be formed into the Gothic arch shape, and may be formed into a V-shape in cross-section perpendicular to the longitudinal direction of the guide body 20 as long as the balls 30 are each held in contact at two points with the load rolling surface 270.

In the load path formed of the load rolling surface 270 constructed as described above and the rolling surface 120 of the track rail 10, the balls 30 roll under a load between the load rolling surface 270 and the rolling surface 120 of the track rail 10. Meanwhile, the no-load path formed of the no-load rolling grooves 230b facing each other has an inner diameter larger than a diameter of each of the balls 30, and hence the balls 30 roll through the no-load path without bearing the load. Further, also in the direction conversion path formed of the direction converting grooves 230c facing each other, the balls 30 roll without bearing the load.

Figure 5:
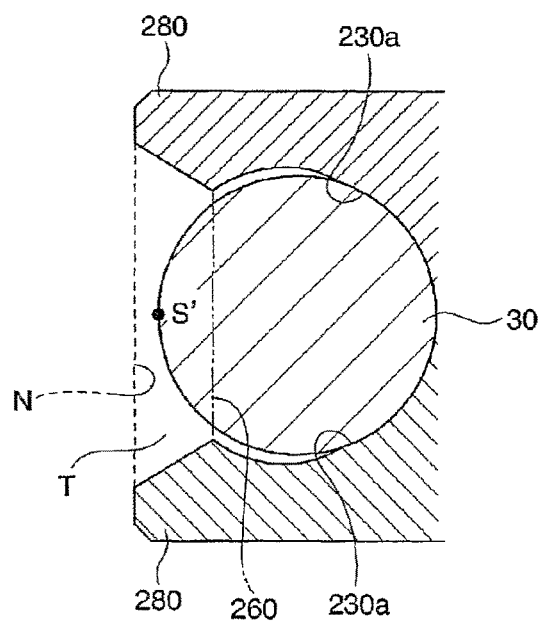
FIG. 5 is an enlarged view of a configuration of guide portions of the guide body illustrated in FIG. 2.

Meanwhile, in each of the halves 210, a guide portion 280 is formed so as to be adjacent to the load opening portion 260 formed of the load rolling grooves 230a facing each other. Under the state in which the pair of halves 210 are coupled so as to face each other, the guide portions 280 are arranged so as to surround the load opening portion 260 therebetween. Those guide portions 280 are formed along the load opening portion 260. In other words, those guide portions 280 are formed along a longitudinal direction of the halves 210. FIG. 5 is a detailed enlarged view of a configuration of the guide portion 280. The guide portion 280 having the configuration described above projects toward the rolling surface 120 of the track rail 10 with respect to tops S' of the spherical surfaces of the balls 30, which are exposed from the load opening portion 260 to the outside of the guide body 20.

Further, under the state in which the pair of halves 210 are coupled so as to face each other, between an imaginary plane N connecting distal end portions of the guide portions 280 of the halves 210 to each other and the top S' of the ball spherical surface exposed from the load opening portion 260 to the outside of the guide body 20, a receiving space T in which the swelling portion 110 of the track rail 10 is inserted is formed. As illustrated in FIG. 3, when the swelling portion 110 of the track rail 10 is inserted into the receiving space T, the guide portion 280 of each of the halves 210 faces a side surface 110a of the swelling portion 110.

In the guide body 20 constructed as described above and the motion guide device including the guide body 20 according to this embodiment, the guide portions 280 project toward the rolling surface 120 of the track rail 10 with respect to the tops S' of the spherical surfaces of the balls 30, which are exposed from the load opening portion 260 to the outside of the guide body 20. Further, those guide portions 280 are constructed to face the side surfaces 110a of the swelling portion 110. Thus, even in a case where the rolling surface 120 of the track rail 10 is corrugated and the balls 30 are separated from the rolling surface 120, the guide portions 280 are engaged with the side surfaces 110a of the swelling portion 110, and further the guide portions 280 are held in sliding contact with the side surfaces 110a along with movement of the guide body 20. With this, the guide body 20 is slid and guided along the track rail 10. As a result, disengagement of the guide body 20 from the track rail 10 can be prevented.

In other words, with the configuration of the guide portions 280, the disengagement of the guide body 20 from the track rail 10 can be prevented, and therefore, the rolling surface 120 of the track rail 10 and the load rolling surface 270 of the guide body 20 may be corrugated. Thus, low-rigidity materials such as a resin material may be used as materials for the track rail 10 and the guide body 20. In this way, the motion guide device can be reduced in weight as a whole. In addition, the track rail 10 and the guide body 20 can be produced by relatively inexpensive forming methods such as injection molding of a resin material. As a result, a production cost of the motion guide device can be reduced. In this case, in consideration of the sliding contact of the guide portions 280 with the swelling portion 110, it is preferred that the guide body 2 be made of materials excellent in anti-friction property and anti-abrasion property, such as polyoxymethylene (POM). Further, in view of securing a strength of the guide body 2, it is preferred that the halves 210 forming the guide body 2 be prepared, for example, by insert molding of solidifying the resin material around a base material made of an aluminum alloy.

Still further, in the guide body 20 to which the present invention is applied and the motion guide device using the guide body 20, even in a case where the rolling surface 120 of the track rail 10 on which the balls 30 roll is corrugated, the guide portions 280 are constructed to prevent the disengagement of the guide body 20 from the track rail 10. With this, the track rail 10 in which straightness of the rolling surface 120 is secured need not be prepared. Thus, the rolling surfaces for the balls can be machined on a structure itself even when straightness thereof is not secured, and the guide body 20 can be applied to this structure. In other words, the track rail to be prepared need not be specially processed, and hence the motion guide device can be enhanced in versatility. In addition, the motion guide device includes the guide body described above, and hence the motion guide device can be provided at lower cost.

Yet further, the configuration of the guide body 20 to which the present invention is applied is simple enough to be completed by coupling the pair of halves 210 so as to face each other. Specifically, the pair of halves 210 are formed into the same shape. With this, the number of components for production of the guide body 20 can be reduced. In addition, in a case where the halves 210 are produced, for example, by injection molding of a resin material, the halves 210 can be formed using the same mold assembly. As a result, a production cost of the halves 210 can be reduced, and hence the guide body 20 itself can be produced at lower cost.

Figure 6:
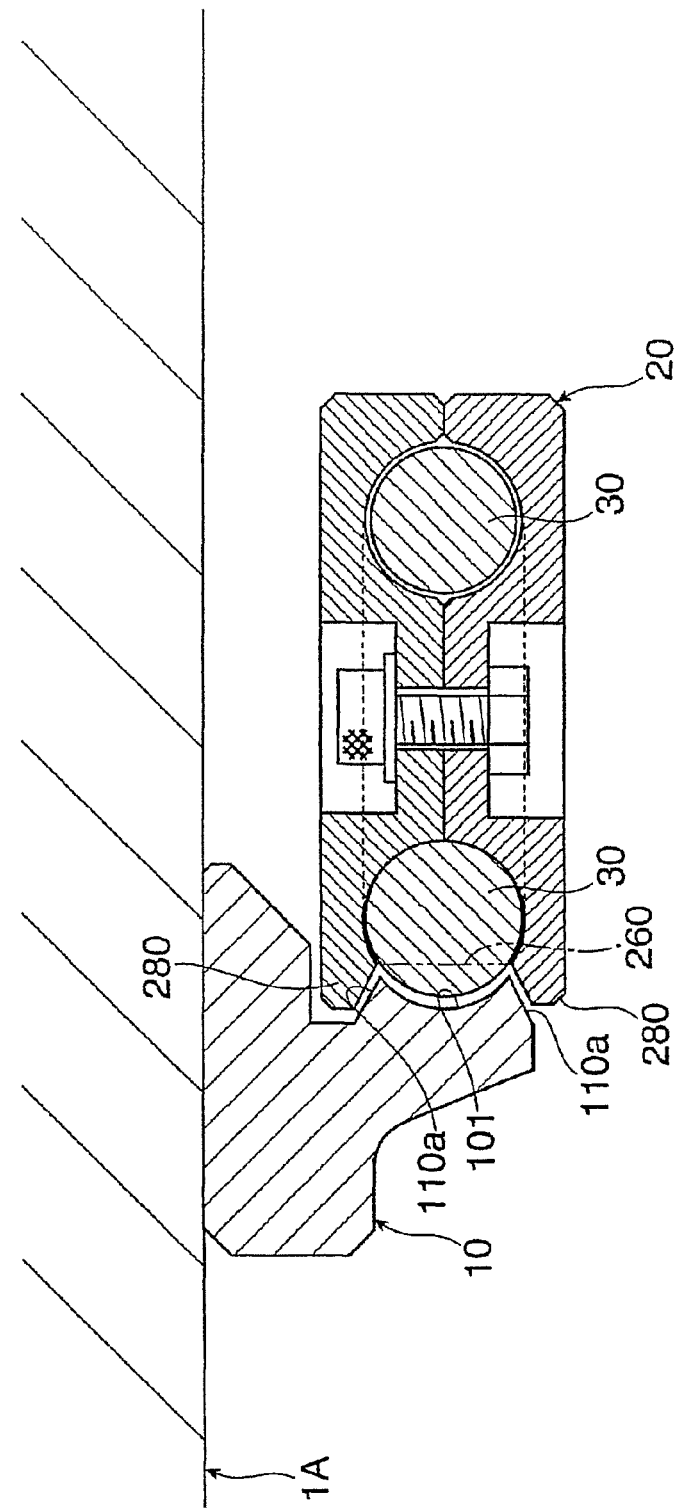
FIG. 6 is a front sectional view of a usage example of the guide body to which the present invention is applied.
Figure 7:
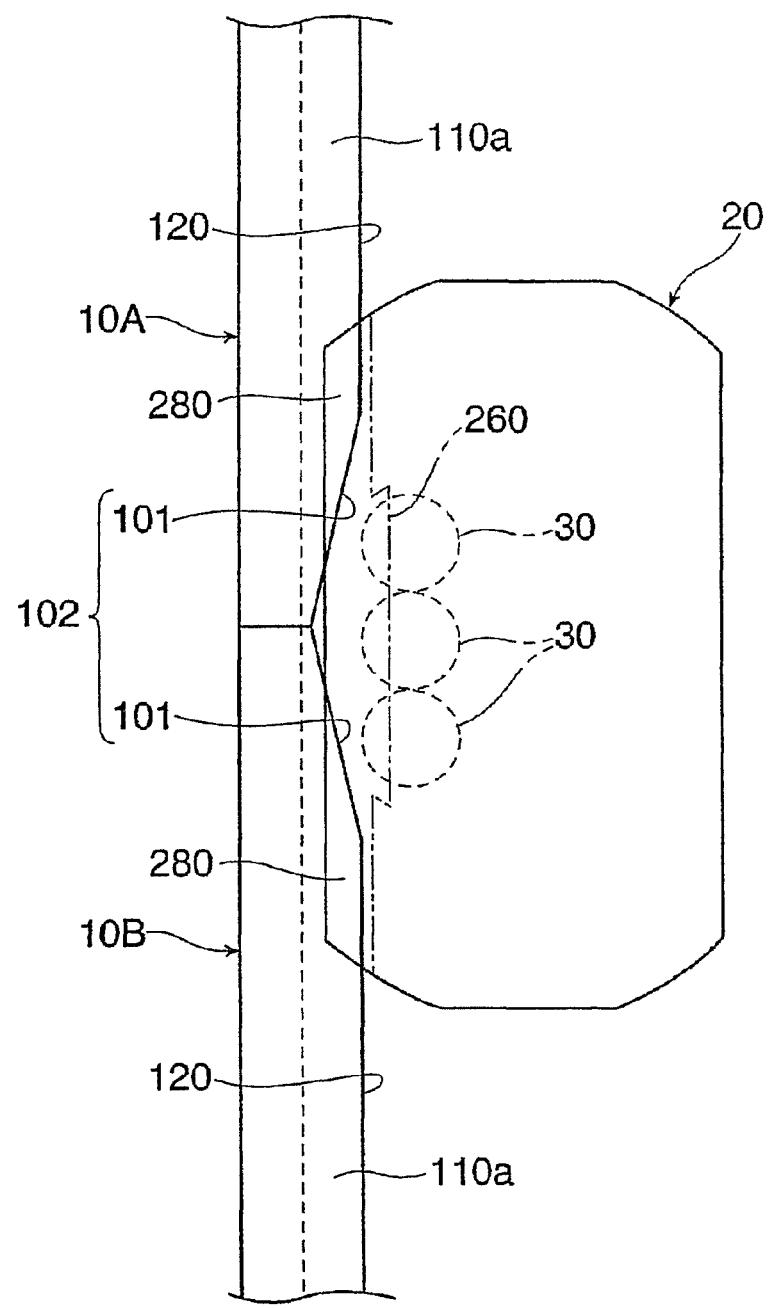
FIG. 7 is a schematic view illustrating an advantage of the guide portion.

The guide body 20 to which the present invention is applied can be moved, for example, along a plurality of track rails 10 that are aligned along the structure 1A. FIGS. 6 and 7 illustrate the configuration of the track rails 10 and the guide body 20 in such a usage example. In such a usage example, the auxiliary chamfered surfaces 101 are formed at end portions in the longitudinal direction of each of the track rails 10 (refer to FIG. 2). Those auxiliary chamfered surfaces 101 are continuous with the rolling surface 120, and inclined with respect to the rolling surface 120.

Thus, in each region in which the end portions of the adjacent track rails 10 face each other, a recessed portion 102 inclined with respect to the rolling surfaces 120 of the track rails 10 is formed. Thus, when the guide body 20 shifts from one track rail 10A to another track rail 10B, the balls 30 exposed from the load opening portion 260 are out of contact with the track rails 10, and hence the balls 30 do not bear a load. As a result, the guide body 20 may be disengaged from a track formed of the plurality of track rails 10.

However, the guide portions 280 are formed in the guide body 20 to which the present invention is applied. With this, when the guide body 20 is moved between the adjacent track rails 10, the guide portions 280 are held in sliding contact with the side surfaces 110a of the swelling portion 110 formed along each of the track rail 10A and the track rail 10B. As a result, even when the balls 30 arranged between the guide body 20 and the track rails 10 are out of contact with the track rails 10, the guide body 20 can be shifted from the one track rail 10A to the another track rail 10B.

Figure 8:
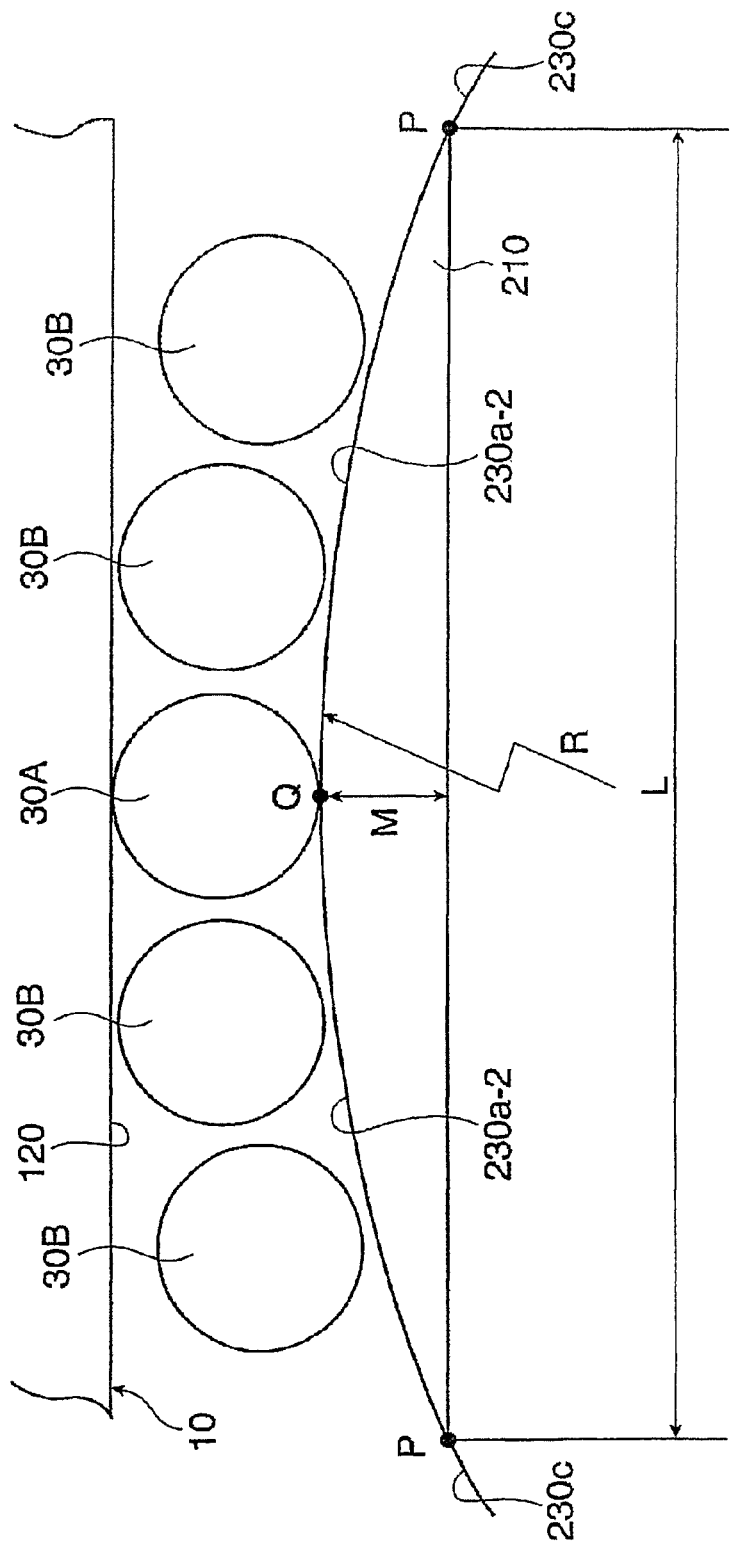
FIG. 8 is a schematic view of a modification of a load rolling groove of the guide body.

Note that, in the guide body 20 according to this embodiment, the load rolling groove 230a is formed into a linear shape along the longitudinal side of each of the halves 210. However, the configuration of the load rolling groove 230a is not limited thereto. FIG. 8 is a schematic view of a modification of the load rolling groove 230a, in which the load rolling groove is viewed in a direction perpendicular to a moving direction of the guide body 20. A load rolling groove 230a-2 according to this modification is formed into a convex curved surface along the moving direction of the guide body 20. A radius of curvature R of this convex curved surface is calculated based on a numerical value indicating a distance L of the load rolling groove 230a-2 in the moving direction of the guide body 20, and on a numerical value indicating a projection distance M at a central portion of the load rolling groove 230a-2 in the moving direction of the guide body 20.

In the guide body 20 according to this embodiment, the distance L in the moving direction of the guide body 20 is set to 15 mm, the projection distance M at the central portion in the moving direction of the guide body 20 is set to 0.1 mm, and the radius of curvature R of the convex curved surface is set to 281.3 mm. Further, the convex curved surface is constructed to pass coupling positions P between the convex curved surface and the direction converting grooves 230c, and pass a central portion Q of the load rolling groove 230a-2 in the moving direction of the guide body 20. Note that, in FIG. 8, for the sake of easier understanding of a curvature of the load rolling groove 230a-2, the curved surface of the load rolling groove 230a-2 is illustrated on an exaggerated scale.

In a case where the balls 30 roll on the load rolling groove 230a-2 constructed as described above, a ball 30A located at a central portion of the load rolling groove 230a-2 in the longitudinal direction thereof is held in contact with the rolling surface 120 of the track rail 10 and the load rolling groove 230*a*-2. Meanwhile, balls 30B other than the ball 30A are spaced away from the rolling surface 120 of the track rail 10 and the load rolling groove 230*a*-2. A distance between each of those balls 30B and the rolling surface 120 and a distance between each of those balls 30B and the load rolling groove 230*a*-2 become larger toward the balls 30B that are farthest from the ball 30A in the moving direction of the guide body 20. In other words, there is still room for those balls 30B to be moved between the rolling surface 120 and the load rolling groove 230*a*-2.

In the case where the load rolling groove is formed into the linear shape, when the rolling surface 120 of the track rail 10 is corrugated, a posture of the guide body 2 is liable to vary in conformity with a shape of the rolling surface 120. However, as for the load rolling groove 230*a*-2 formed into the convex curved surface, there is still room for the balls 30B to be moved between the rolling surface 120 and the load rolling groove 230*a*-2, and hence a posture of the guide body 20 is easily stabilized.

Figure 9:
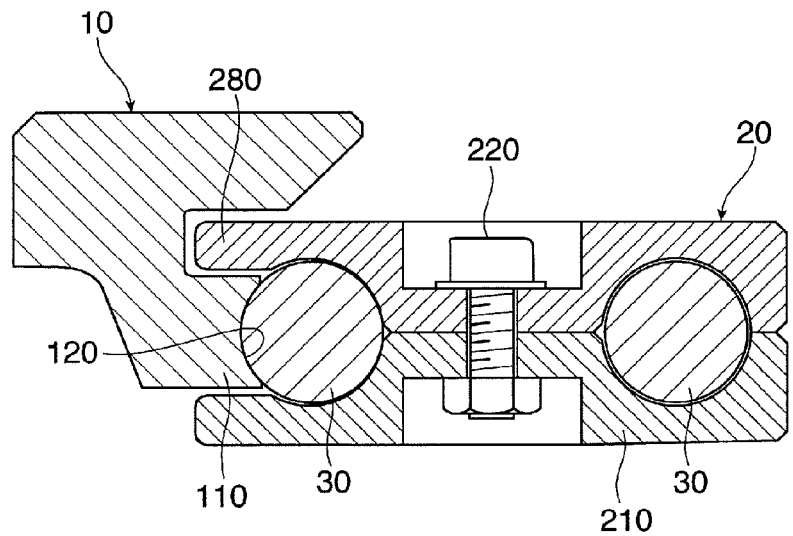
FIG. 9 is a front sectional view of an example of the guide portion in which a setting is changed.

Further, in the guide body 20 according to this embodiment, in consideration of disengagement of the guide body, the configuration of the guide portions 280 can be changed as appropriate. FIG. 9 illustrates a modification of the guide portions 280. As understood from the comparison between FIG. 9 and FIG. 3, the guide portions 280 according to this modification project toward the track rail 10 farther than the guide portions 280 illustrated in FIG. 3. In conformity therewith, the swelling portion 110 of the track rail 10 projects toward the guide body 20.

In this way, even in a case where the rolling surface 120 formed along the track rail 10 is corrugated due to low processing accuracy, the guide portions 280 are projected by a large amount, and hence the guide portions 280 are reliably held in sliding contact with the swelling portion 110. Thus, the guide body 20 can be slid and guided along the track rail 10. As a result, the disengagement of the guide body 20 from the track rail 10 can be more reliably prevented.

Figure 10:
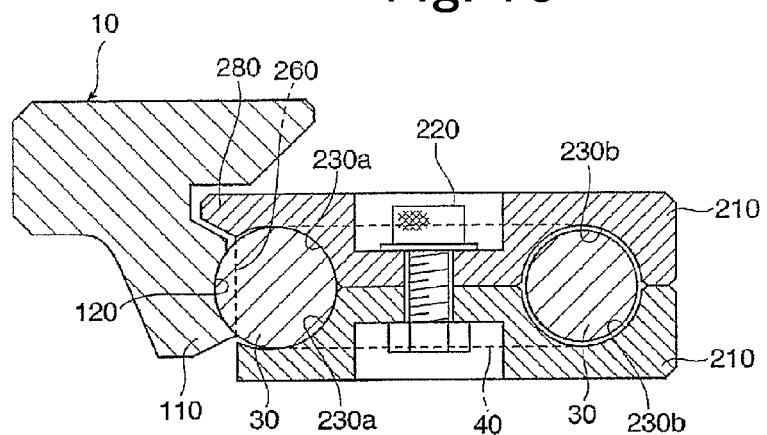
FIG. 10 is a front sectional view of a first modification of the guide body to which the present invention is applied.

Note that, in the guide body 20 according to this embodiment, the halves 210 respectively have the guide portions 280, and are formed into the same shape. However, as long as disengagement of the guide body 20 from the track rail 10 can be prevented by the configuration of the guide portions 280, as illustrated in FIG. 10, the guide portion 280 may be formed on only one of the halves 210. Note that, the configuration in which the halves 210 respectively have the guide portions 280 and in which the halves 210 are formed into the same shape is more advantageous in view of simplification of production.

Figure 11:
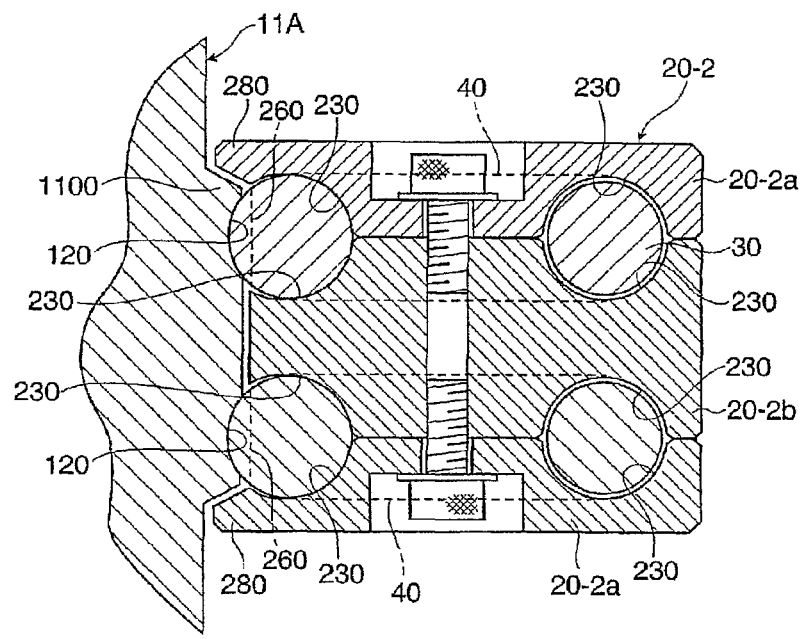
FIG. 11 is a front sectional view of a second modification of the guide body to which the present invention is applied.

Meanwhile, FIG. 11 illustrates a modification of the guide body to which the present invention is applied. In this modification, components that have the same shapes as those in the guide body 20 described above are denoted by the same reference symbols as those of the components of the guide body 20. In this modification, a single swelling portion 1100 is formed along a structure 11A such as a furniture piece, and two rolling surfaces 120 are formed along this swelling portion 1100. Meanwhile, a guide body 20-2 according to this modification is assembled to the structure 11A in a freely movable manner. This guide body 20-2 includes a pair of plate bodies 20-2*a* each having an endless ball rolling groove 230, and an intermediate body 20-2*b* having two ball rolling grooves 230 formed in directions opposite to each other. In addition, the pair of plate bodies 20-2*a* are fixed to the intermediate body 20-2*b* in a manner of sandwiching the intermediate body 20-2*b* so that two endless circulation paths 40 are formed.

Further, in the guide body 20-2, the load opening portion 260 is formed so that a part of each of the spherical surfaces of the balls 30 in the endless circulation path 40 is held in contact with the rolling surface 120 of the structure 11A. As described above, in this modification, the two endless circulation paths 40 are formed, and hence two load opening portions 260 are formed in the guide body 20-2. Still further, the guide portion 280 is formed along each of the plate bodies 20-2*a*. Under a state in which the pair of plate bodies 20-2*a* and the intermediate body 20-2*b* are coupled to each other, the guide portions 280 of the respective plate bodies 20-2*a* are arranged so as to surround the two load opening portions 260 therebetween. Also in the guide body 20-2 constructed as described above, disengagement of the guide body 20-2 from the structure 11A can be prevented by the configuration of the guide portions 280.

Figure 12:
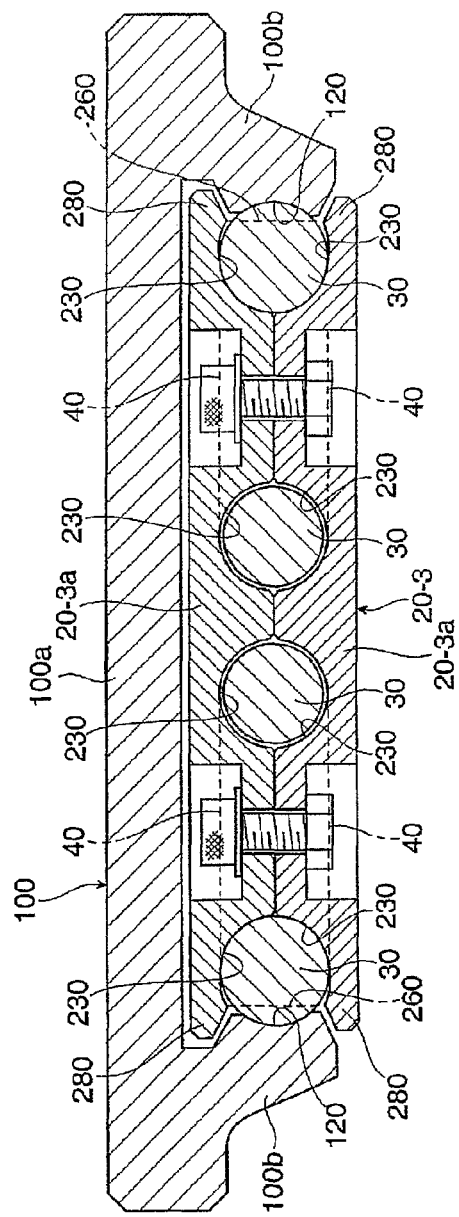
FIG. 12 is a front sectional view of a third modification of the guide body to which the present invention is applied.

Further, as another modification of the guide body to which the present invention is applied, there may be employed a guide body illustrated in FIG. 12. In this modification, components that have the same shapes as those in the guide body 20 described above are denoted by the same reference symbols as those of the components of the guide body 20. A track rail 100 according to this modification is formed into a channel shape in cross-section having a horizontal portion 100*a*, and a pair of upright rolling portions 100*b* formed orthogonally to this horizontal portion 100*a*. The rolling surface 120 for the balls 30 is formed on an inner surface of each of the rolling portions 100*b*.

Meanwhile, a guide body 20-3 is inserted between the pair of rolling portions 100*b*, and includes a pair of halves 20-3*a* formed into the same shape. The halves 20-3*a* each have two endless ball rolling grooves 230. When the pair of halves 20-3*a* are coupled so as to face each other, two endless circulation paths 40 are formed in the guide body 20-3. Further, the guide body 20-3 has two load opening portions 260 so that the balls 30 in the endless circulation paths 40 are held in contact with the rolling surfaces 120 of the track rail 100. In this guide body 20-3, the load opening portions 260 are opened in directions opposite to each other. Further, the guide portions 280 are formed on each of the halves 20-3*a*. Under a state in which the pair of halves 20-3*a* are coupled to each other, the guide portions 280 of each of the halves 20-3*a* are arranged so as to surround the load opening portions 260 therebetween. Also in the guide body 20-3 according to this modification, disengagement of the guide body 20-3 from the track rail 100 can be prevented by the configuration of the guide portions 280.

Figure 13:
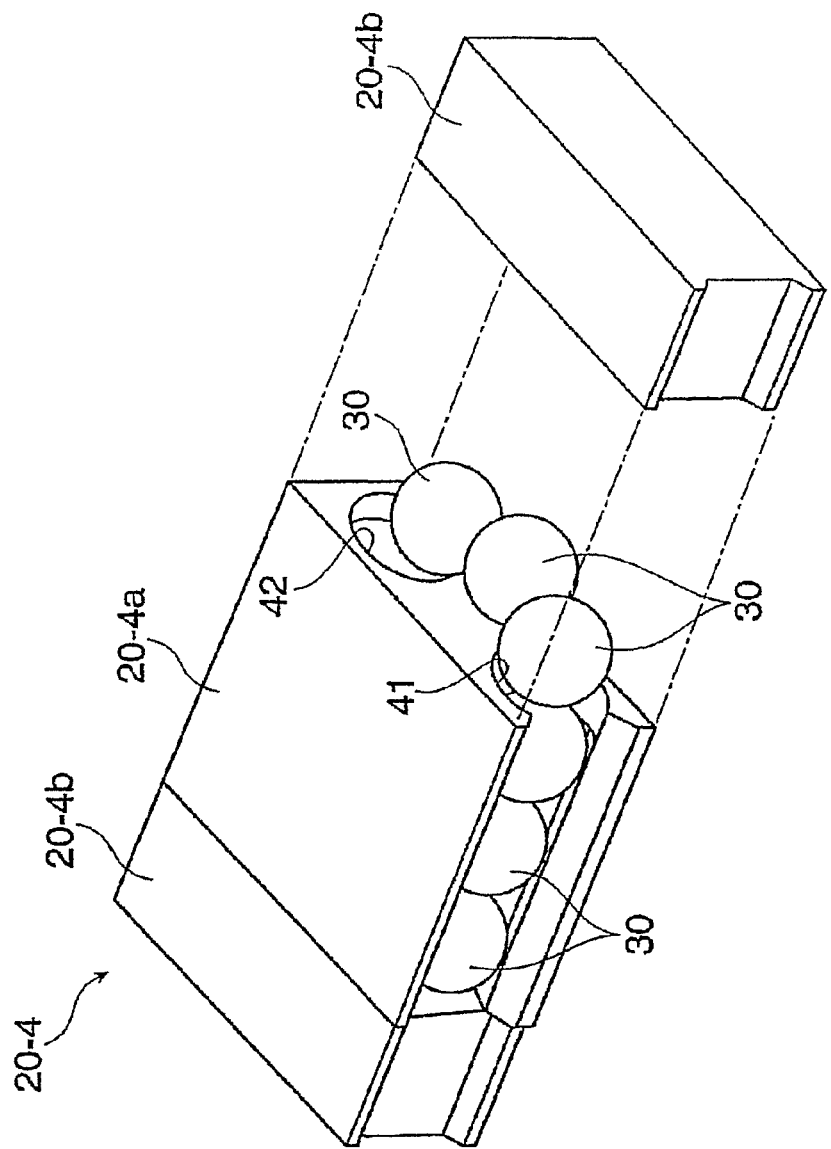
FIG. 13 is an exploded perspective view of a fourth modification of the guide body to which the present invention is applied.

Further, in the guide body 20 according to this embodiment, when the pair of halves 210 are coupled so as to face each other, the endless ball rolling grooves 230 face each other. With this, the endless circulation path for the balls 30 is completed (refer to FIG. 2). The configuration of the guide body to which the present invention is applied is not limited thereto, and the configuration illustrated in FIG. 13 may be employed. Specifically, a guide body 20-4 illustrated in FIG. 13 includes a guide body main body 20-4*a* and a pair of lid bodies 20-4*b* that are fixed to this guide body main body 20-4*a*. The guide body main body 20-4*a* has a load path 41 through which the balls 30 roll under a load, and a no-load path 42 through which the balls 30 roll under a no-load state. In each of the lid bodies 20-4*b*, a direction converting groove is formed so as to convert a rolling direction of the balls 30. After rolling through the load path 41, the balls 30 enter the lid bodies 20-4*b*. With this, the rolling direction of the balls 30 is converted. In other words, when the pair of lid bodies 20-4b are fixed to the guide body main body 20-4a, an endless circulation path for the balls 30 is completed.

Figure 14:
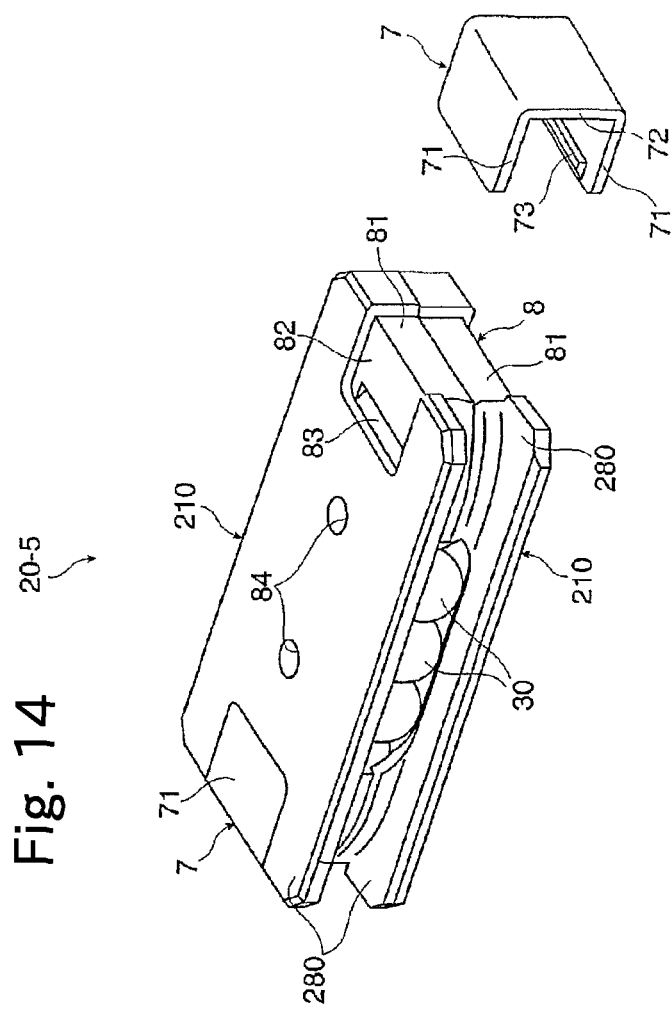
FIG. 14 is a perspective view of a fifth modification of the guide body to which the present invention is applied.
Figure 15:
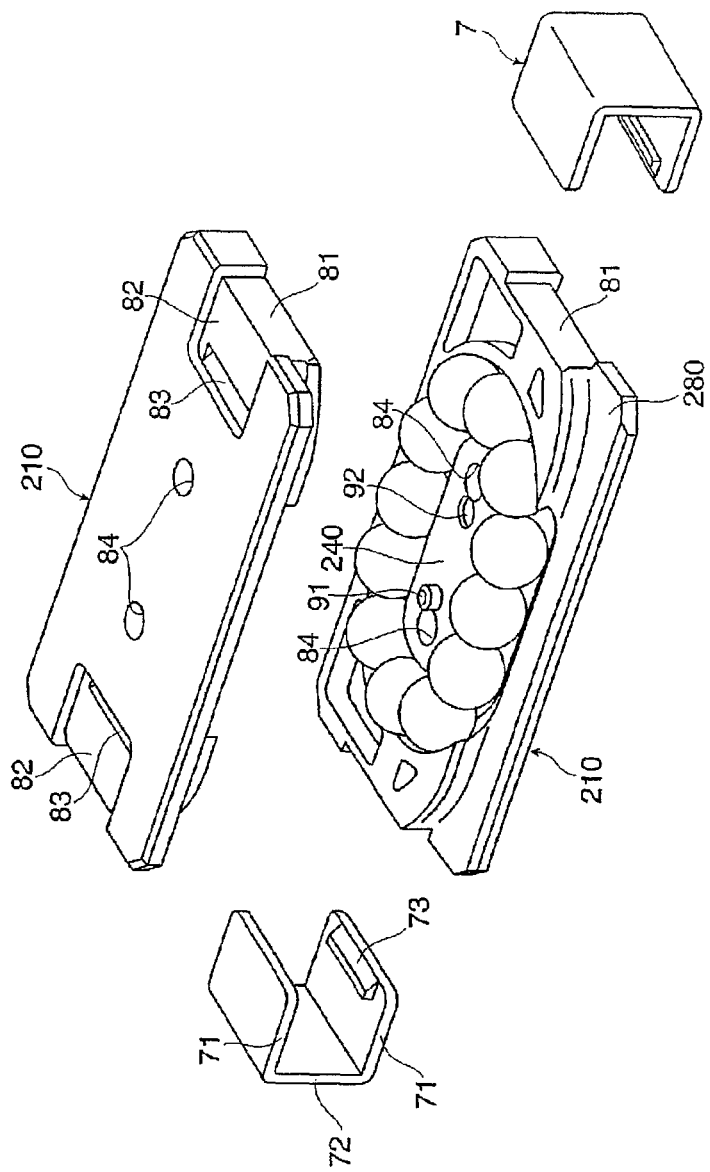
FIG. 15 is an exploded perspective view of the modification illustrated in FIG. 14.
Figure 16:
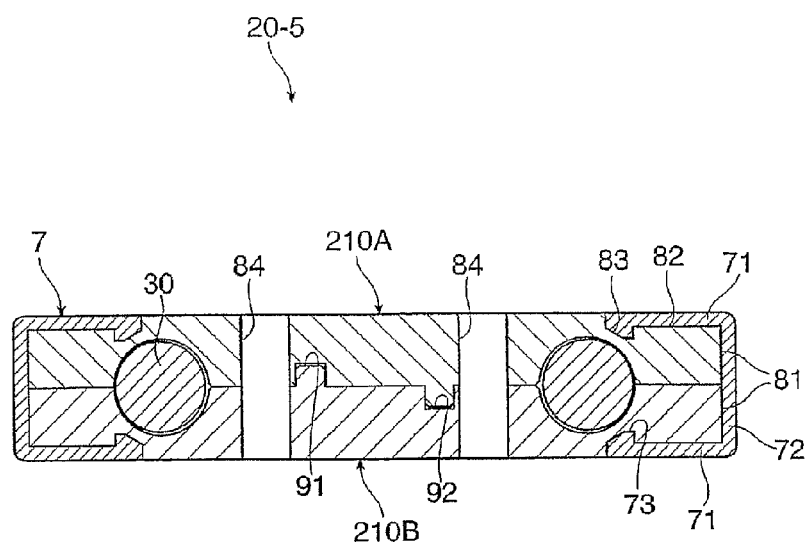
FIG. 16 is a front sectional view of the modification illustrated in FIG. 14.

Next, with reference to FIGS. 14 to 16, description is made of another modification of the guide body to which the present invention is applied. In the embodiment illustrated in FIG. 2, the guide body 20 is formed of the pair of halves 210, and the pair of those halves 210 are coupled to each other with the fixing bolts 220. Alternatively, the pair of those halves 210 may be coupled to each other with a fixing mechanism other than the fixing bolts 220.

A guide body 20-5 according to this embodiment includes a pair of retaining members 7 as the fixing mechanism. The retaining members 7 are each formed into a C-shape in cross-section, which has a pair of side portions 71 and a central portion 72 for coupling the pair of those side portions 71. The side portions 71 each includes an engaging projection 73 for allowing the retaining members 7 to be mounted respectively to the halves 210. Meanwhile, in each of the halves 210, a pair of first fixing surfaces 81 are formed on both end surfaces in a moving direction of the halves 210, and a pair of second fixing surfaces 82 are formed orthogonally to the respective first fixing surfaces 81. An engaging groove 83 is formed in each of the second fixing surfaces 82, and allows the engaging projection 73 of the retaining member 7 to be inserted thereinto. Further, the projection portion 240 of each of the halves 210 has a positioning projection 91 and a positioning hole 92.

In the guide body 20-5 according to this embodiment, when the pair of halves 210 are coupled so as to face each other, the positioning projection 91 of one half 210 is fitted into the positioning hole 92 of the other half 210. In this way, the pair of halves 210 are positioned to each other (refer to FIG. 16).

When the pair of halves 210 are positioned to each other in this way, the first fixing surfaces 81 of the halves 210 are formed continuous with each other. With this, fixing grooves 8 are completed to be continuous from the second fixing surfaces 82 of the one half 210 to the second fixing surfaces 82 of the other half 210. Then, when the retaining members 7 are fitted into the fixing grooves 8 in a moving direction of the guide body 20-5, the engaging projections 73 are engaged with the engaging grooves 83 in the second fixing surfaces 82. In this way, the pair of halves 210 are fixed to each other. In other words, the pair of halves 210 are fixed to each other in what is called a snap-fit manner. As understood from FIGS. 14 and 16, under the state in which the retaining members 7 are fitted to the fixing grooves 8, the retaining members 7 are mounted astride the pair of halves 210 so that those halves 210 are sandwiched in a direction perpendicular to the moving direction of the guide body 20-5.

Note that, in FIG. 14, for the sake of easier understanding of a fitting relationship between the fixing grooves 8 and the retaining members 7, one of the retaining members 7 is removed from the fixing groove 8. Note that, in FIGS. 14 to 16, reference symbol 84 denotes fixation holes that are utilized at the time of fixing the movable body to the guide body 20-5.

According to the guide body 20-5 described above, the pair of halves 210 can be fixed to each other only by fitting the retaining members 7 to the fixing grooves 8, and hence this guide body can be assembled with a smaller number of operational man-hours than those for the guide body 20. Further, the guide body to which the present invention is applied is formed by combining the pair of halves to each other. Thus, when an unintended external force is applied to the guide body, for example, the guide body may be deformed. In particular, in a case where an external force in the moving direction is applied to the guide body, a joint between the pair of halves may be expanded to cause the ball to be dropped off an inside of the endless circulation path. However, according to the guide body 20-5 of this embodiment, the pair of halves 210 are sandwiched by the pair of retaining members 7 at both end portions in the moving direction of the guide body 20-5. Thus, the guide body 20-5 can be prevented from being deformed at the time when the external force is applied to the guide body 20-5.

Figure 17:
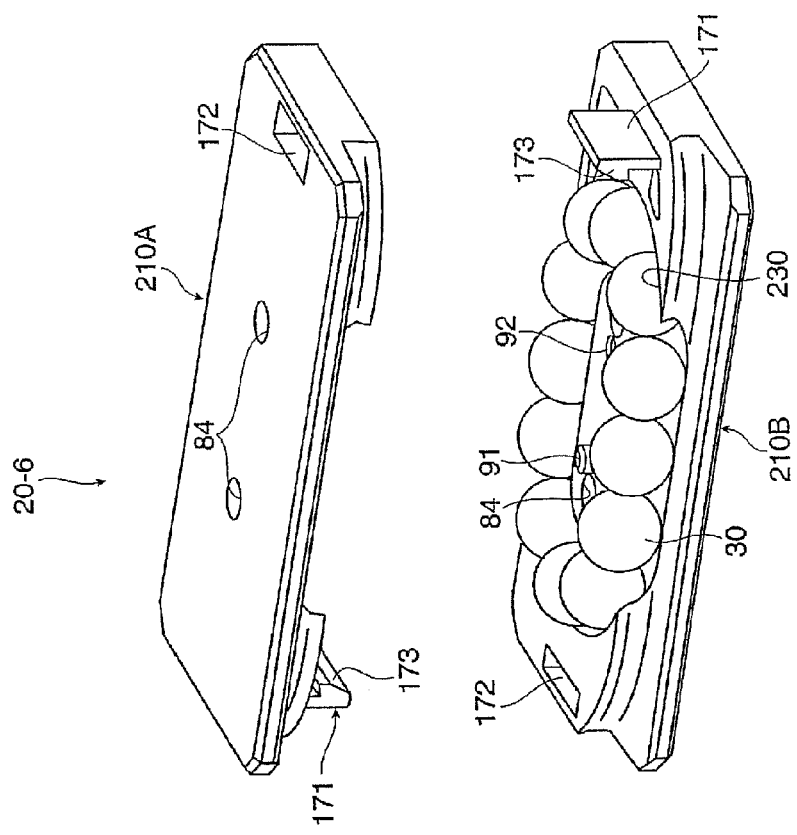
FIG. 17 is an exploded perspective view of a sixth modification of the guide body to which the present invention is applied.
Figure 18:
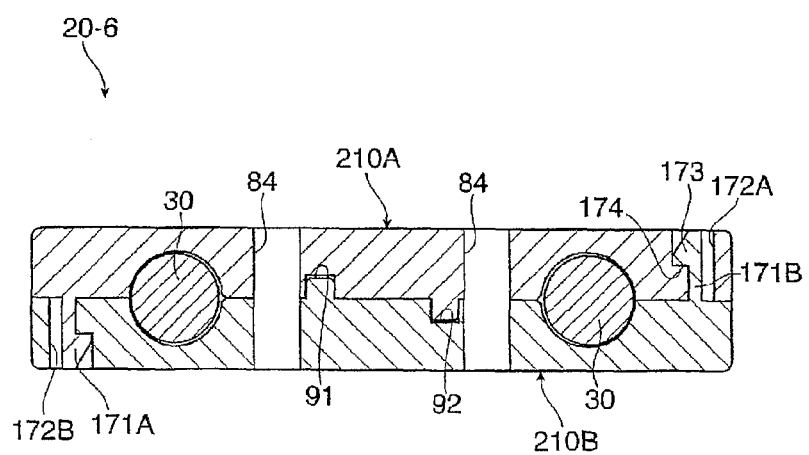
FIG. 18 is a front sectional view of the modification illustrated in FIG. 17.
Figure 19:
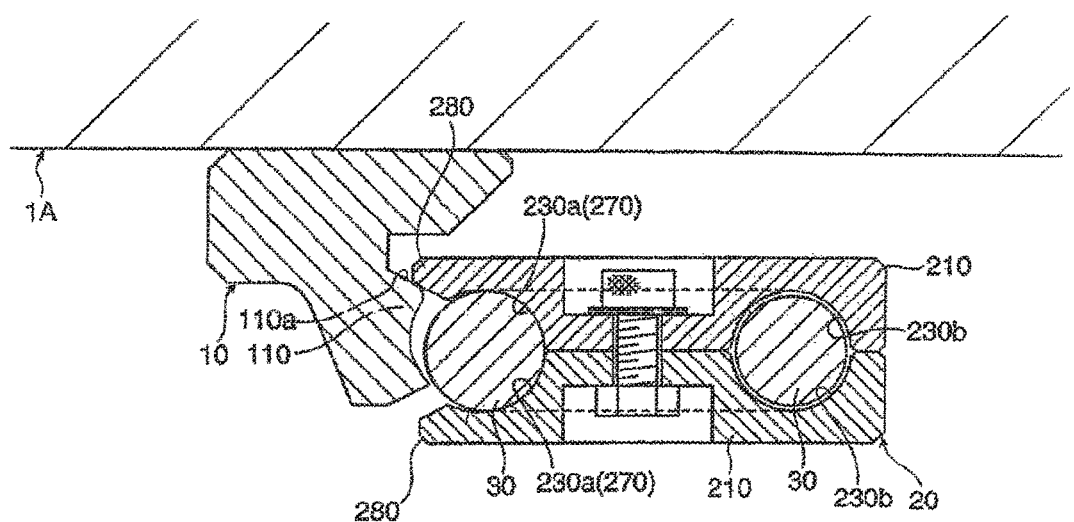
FIG. 19 is a front sectional view of a case where the balls are separated from the rolling surface of the guide portions.
Figure 20:
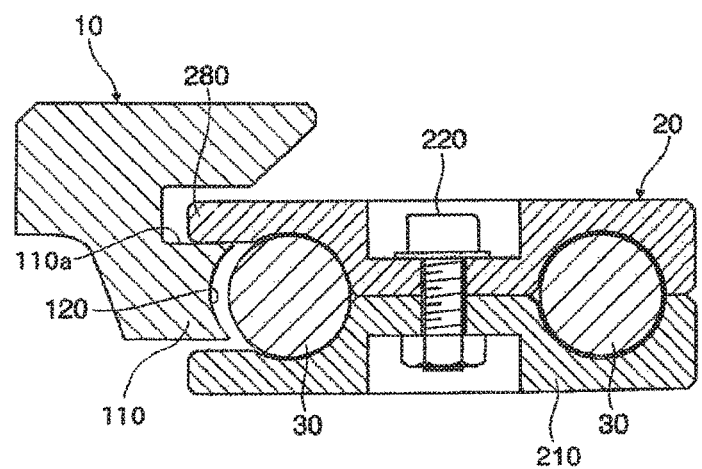
FIG. 20 is a front sectional view of the example of the guide portion in which the setting is changed in a case where the balls are separated from the rolling surface of the guide portions.

FIGS. 17 and 18 illustrate another modification of the guide body to which the present invention is applied. A guide body 20-6 of this embodiment is different from the guide body 20-5 described above only in configuration of the fixing mechanism. Specifically, this fixing mechanism is provided directly to each of the halves 210. Thus, the same components are denoted by the same reference symbols as those in the embodiment illustrated in FIGS. 14 and 16, and description thereof is omitted. The halves 210 according to this embodiment each have an engaging projection 171 and an engagement hole 172. Those engaging projection 171 and engagement hole 172 are formed so as to be flush with a plane in which the ball rolling groove 230 is formed. Further, an engaging craw 173 is formed at a distal end of the engaging projection 171, and a step portion 174 is formed on an inner portion of the engagement hole 172 (refer to FIG. 18).

Then, when the pair of halves 210 are assembled to each other so that the respective ball rolling grooves 230 face each other, an engaging projection 171A of a half 210A is inserted into an engagement hole 172B of a half 210B, and an engaging projection 171B of the half 210B is inserted into an engagement hole 172A of the half 210A. In this state, the engaging craws 173 of the engaging projections 171 are engaged with the step portions 174 of the engagement holes 172. With this, the pair of halves 210 are fixed to each other. In other words, similarly to the guide body 20-5, also in the guide body 20-6 according to this embodiment, the pair of halves 210 are fixed to each other in what is called the snap-fit manner.

According to this guide body 20-6, the guide body 20-6 is completed only by assembling the pair of halves 210 to each other. Thus, operations such as fastening of the fixing bolts need not be performed, and hence the guide body can be assembled with a smaller number of operational man-hours. Further, the fixing mechanism is provided directly to each of the halves 210. Thus, in a case where the pair of halves 210 are produced, for example, by injection molding of a resin material, the fixing mechanism can be provided during the molding. Therefore, the guide body itself can be produced at lower cost than that of the guide body 20-5 described above. In addition, the halves 210 are formed into the same shape, and hence those halves 210 can be molded using the same mold assembly in the case where the halves 210 are produced by the injection molding of a resin. As a result, a production cost of the halves 210 can be reduced, and hence the guide body 20-6 itself can be produced at lower cost.

In the guide bodies according to the embodiments described above, the balls are used as rolling elements, but rollers may be used as the rolling elements.

The invention claimed is:
1. A device for moving a movable body, comprising:
a structure having swelling portion formed continuously along the moving direction of the movable body, and having at least a single rolling groove formed in a distal end surface of the swelling portion, the rolling groove facing in a horizontal direction; and a guide body fixed to the movable body and configured to move relative to the structure, the guide body comprising
- a plurality of rolling elements that roll on the rolling groove and are held in contact with the rolling groove along the horizontal direction;
- at least one endless circulation path through which the plurality of rolling elements circulate;
- a load opening portion formed so as to open to the rolling groove, the load opening portion allowing the plurality of rolling elements in the endless circulation path to be held in contact with the rolling groove; and
- a guide portion formed on a side of the load opening portion such that, in a case where the plurality of rolling elements is held in contact with the rolling groove, the guide portion faces a side surface of the swelling portion with a gap therebetween, wherein, in a case where the plurality of rolling elements is separated from the rolling groove, the guide portion is held in sliding contact with the side surface of the swelling portion such that the guide body is configured to move relative to the structure, wherein projecting ends of the plurality of rolling elements project from the load opening portion toward the structure side, and wherein a part of the guide portion opposite to the side surface of the swelling portion protrudes a first distance toward the structure side, wherein the plurality of rolling elements protrudes a second distance from the load opening portion toward the structure side, and wherein the first distance exceeds the second distance.

2. The device for moving a movable body according to claim 1,
wherein the guide body comprises a pair of halves having the same shape, the pair of halves being coupled to each other,
wherein each of the pair of halves comprises an endless rolling-element rolling groove, and
wherein the endless circulation path for the plurality of rolling elements and the load opening portion are formed by coupling the pair of halves so as to face each other.

3. The device for moving a movable body according to claim 2, wherein the pair of halves are fixed to each other at both end portions of each of the pair of halves in a moving direction thereof.

4. The device for moving a movable body according to claim 3, wherein the pair of halves are fixed to each other in a snap-fit manner.

5. The device for moving a movable body according to claim 1,
wherein the endless circulation path of the guide body comprises a load rolling surface for allowing the plurality of rolling elements to roll under a load between the load rolling surface and the rolling groove, and
wherein the load rolling surface is formed into a convex curved surface along a longitudinal direction of the load opening portion.

6. A motion guide device, comprising:
a track rail having a swelling portion formed continuously along a longitudinal direction, the track rail having at least one rolling groove formed in a distal end surface of the swelling portion, the rolling groove facing in a horizontal direction; and a guide body assembled to the track rail through intermediation of a plurality of the rolling elements in a freely movable manner, the guide body comprising
- at least one endless circulation path through which the plurality of rolling elements circulate;
- a load opening portion which is open to the rolling groove of the track rail, the load opening portion allowing the plurality of rolling elements in the endless circulation path to be held in contact with the rolling groove; and
- a guide portion formed on a side of the load opening portion such that, in a case where the plurality of rolling elements is held in contact with the rolling groove, the guide portion faces a side surface of the swelling portion with a gap therebetween, wherein, in a case where the plurality of rolling elements is separated from the rolling groove, the guide portion is held in sliding contact with the side surface of the swelling portion such that the guide body is configured to move relative to the track rail, wherein projecting ends of the plurality of rolling elements project from the load opening portion toward the track rail side, and wherein a part of the guide portion opposite to the side surface of the swelling portion protrudes a first distance toward the track rail side, wherein the plurality of rolling elements protrudes a second distance from the load opening portion toward the track rail side, and wherein the first distance exceeds the second distance.

7. A device for moving a movable body, comprising:
a structure having swelling portion formed continuously along the moving direction of the movable body, and having at least a single rolling groove formed in a distal end surface of the swelling portion, the rolling groove facing in a horizontal direction; and a guide body fixed to the movable body and configured to move relative to the structure, the guide body comprising
- a plurality of rolling elements that roll on the rolling groove and are held in contact with the rolling groove along the horizontal direction;
- at least one endless circulation path through which the plurality of rolling elements circulate;
- a load opening portion formed so as to open to the rolling groove, the load opening portion allowing the plurality of rolling elements in the endless circulation path to be held in contact with the rolling groove; and
- a guide portion formed on a side a pair of guide portions formed on opposing sides of the load opening portion so as to surround the load opening portion therebetween, each of the guide portions such that; in a case where the plurality of rolling elements is held in contact with the rolling groove, the guide portion faces facing a side surface of the swelling portion with a gap therebetween, wherein; in a case where the plurality of rolling elements is separated from the rolling groove; the guide portion is portions are held in contact with the side surface of the swelling portion such that the guide body is configured to move relative to the structure, in a case where the plurality of rolling elements are separated from the rolling groove, wherein projecting ends of the plurality of rolling elements project from the load opening portion toward the structure side, wherein a part of the guide portion opposite to the side surface of the swelling portion horizontally protrudes toward the structure a first distance, wherein the first distance is greater than a depth along the horizontal direction of the rolling groove formed in the swelling portion.

8. The device for moving a movable body according to claim 7,
wherein the guide body comprises a pair of halves having the same shape, the pair of halves being coupled to each other,
wherein each of the pair of halves comprises an endless rolling-element rolling groove, and
wherein the endless circulation path for the plurality of rolling elements and the load opening portion are formed by coupling the pair of halves so as to face each other.

9. The device for moving a movable body according to claim 8,
wherein the pair of halves are fixed to each other at both end portions of each of the pair of halves in a moving direction thereof.

10. The device for moving a movable body according to claim 9,
wherein the pair of halves are fixed to each other in a snap-fit manner.

11. The device for moving a movable body according to claim 7,
wherein the endless circulation path of the guide body comprises a load rolling surface for allowing the plurality of rolling elements to roll under a load between the load rolling surface and the rolling groove, and
wherein the load rolling surface is formed into a convex curved surface along a longitudinal direction of the load opening portion.

12. A motion guide device, comprising:
a track rail having a swelling portion formed continuously along a longitudinal direction, the track rail having at least one rolling groove formed in a distal end surface of the swelling portion, the rolling groove facing in a horizontal direction; and
a guide body assembled to the track rail through intermediation of a plurality rolling elements in a freely movable manner, the guide body comprising
at least one endless circulation path through which the plurality of rolling elements circulate;
a load opening portion which is open to the rolling groove of the track rail, the load opening portion allowing the plurality of rolling elements in the endless circulation path to be held in contact with the rolling groove; and
a guide portioned on a side a pair of guide portions formed on opposing sides of the load opening portion so as to surround the load opening portion therebetween each of the guide portions such that, in a case where the plurality of rolling elements is held in contact with the rolling groove, the guide portion faces facing a side surface of the swelling portion with a gap therebetween,
wherein, in a case where the plurality of rolling elements is separated from the rolling groove, the guide portion is portions are held in contact with the side surface of the swelling portion such that the guide body is configured to move relative to the track rail, in a case where the plurality of rolling elements are separated from the rolling groove,
wherein projecting ends of the plurality of rolling elements project from the load opening portion toward the track rail side,
wherein a part of the guide portion opposite to the side surface of the swelling portion horizontally protrudes toward the structure a first distance, wherein the first distance is greater than a depth along the horizontal direction of the rolling groove formed in the swelling portion.

* * * * *